UNITED STATES PATENT OFFICE 2,496,653

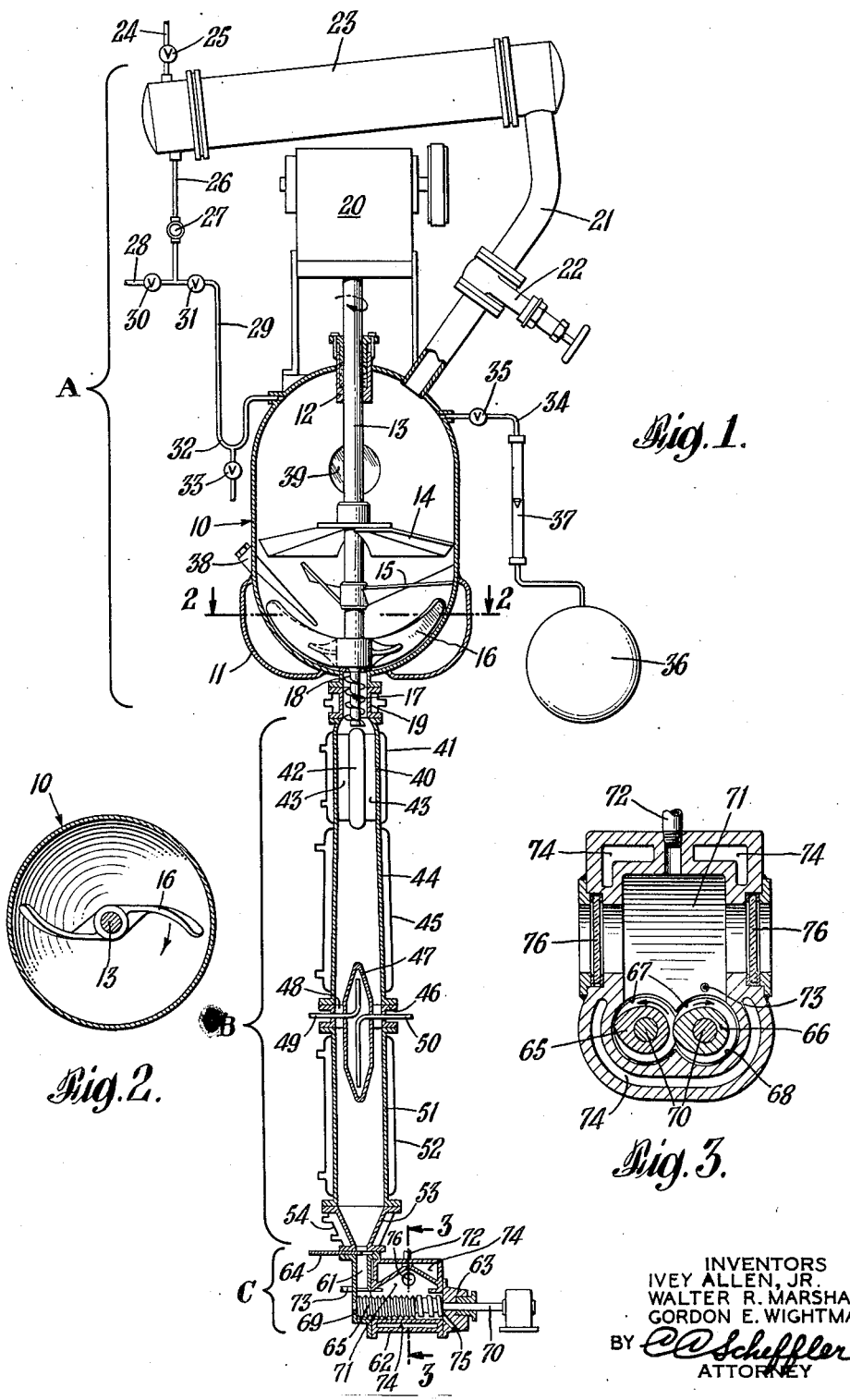

CONTINUOUS BULK POLYMERIZATION OF STYRENE

Ivey Allen, Jr., and Walter R. Marshall, Bloomfield, and Gordon E. Wightman, Upper Montclair, N. J., assignors, by mesne assignments, to Union Carbide and Carbon Corporation, a corporation of New York Application October 12, 1943, Serial No. 505,908

7 Claims. (Cl. 260—93.5)

The invention relates to the polymerization of unsaturated organic compounds into solid glass-like resins. In general they are vinyl compounds, such as the acetate, butyrate, etc., and the aromatic compounds including styrene, chlorostyrenes, methyl, ethyl and propyl styrenes, vinyl naphthalene, etc. More specifically, the invention is concerned with the polymerization of styrene, and it is hereinafter described in that connection.

Polystyrene is fitted for many industrial uses because of its properties. It has excellent electrical properties and particularly low power factors at very high frequencies, and is in fact the only rigid organic plastic so characterized; it has the lowest gravity of any of the rigid plastics, and its shrinkage after molding is unusually low; it is strong enough to withstand considerable amount of rough usage, and it retains its strength at low temperatures; it has low water absorption, high chemical resistance and good dimensional stability. In addition it is readily molded by injection, for it fluxes and flows quite freely in the temperature range for injection molding to fill every detail of a mold without the addition of solvent or plasticizer; on cooling, it hardens rapidly and can be ejected from the mold at higher temperatures than is customary with other thermoplastics of comparable fluidity used for injection molding.

The quality of the monomer used has much to do with the processing of the monomer into the polymer and the properties of the polymer on account of the difficulties experienced in removing the last few per cent of impurities and unreacted material from the polymer. In a patent to Allen No. 2,273,822, February 24, 1942, a batch process is disclosed whereby a polymer having not more than 3 per cent of methanol-soluble constituents and an average molecular weight of over 40,000 is obtained by (a) heating with agitation in a reaction vessel or autoclave at about 110° C. to about a 50–60 per cent conversion, (b) cooling and discharging in relatively small portions into cans maintained at about 90°–110° C. and converting to a 90–95 per cent polymerization, and (c) working the finished polymer on heated differential rolls at 125° C.

The process of the patent, however, has its limitations. In the autoclave operation it is not feasible to reach more than about 60 per cent polymerization, because the mass at the temperature of reaction becomes too viscous for further agitation with the usual autoclave equipment. But agitation is essential, for the polymerized mass has extremely low heat conductivity and the polymerization is an exothermic reaction; unless the mass then is thoroughly stirred to blend into substantial homogeneity, portions are apt to reach runaway temperatures of 200° C. or more with the consequent formation of styrene dimers, trimers and other objectional low polymers. For this reason, when agitation in the autoclave is no longer practical, the Allen patent proposes the subdivision of the still mass into small portions in cans maintained at low temperatures for the polymerization of the remaining unreacted monomer.

As recognized by the Allen patent, a principal problem is that of polymerization at the relatively low temperatures of around 110° C.; if the polymerization could be completed at about this temperature, there would be little low molecular weight polymerization products formed. But completion in bulk at low temperature is not practical, for it is characteristic of polymerizing reactions that the reaction rate is proportional to the amount of reacting material present; consequently, as the concentration of monomeric styrene decreases, the rate of polymer formation also decreases and becomes very slow toward the end of the reaction. Moreover, the amount of low molecular weight products, particularly styrene dimer and trimer formed during polymerization at the low control temperatures of 90°–110° C., though small, is of great importance in determining the physical properties of the final product; in a styrene polymerized to completion at a constant temperature of 110° C., the low molecular weight liquid material, or mixture boiling up to about 300° C. at 10 mm. pressure, is present to the extent of about 1.5 per cent. This 1.5 per cent of high boiling liquid material, in addition to the small remnant of monomer always present and the small amount of ethyl benzene and other volatile present in even the purest commercial styrene monomer, is sufficient to lower the softening point of the product from about 90°–92° C. (as determined by the A. S. T. M. test) to about 78°–82° C., which is the softening point range for present commercial polymerized styrene.

In the U. S. patent to Wulff and Dorrer No. 2,077,542, April 20, 1937, the deleterious effect of lowering of the softening point and mechanical strength by a small percentage of volatile present is emphasized (page 3, column 1, lines 45–52; column 2, lines 40–42), though the patent apparently recognizes only the effect of volatile removable by evaporation upon exposure to air (page 3, column 2, lines 20-24); that the Wulff and Dorrer product contains liquid constituents not removed by evaporation in air is evidenced by the softening point range of 68°-80° C. (table page 3) and by the softening point of around 80° C. that is typical of present commercial grades of polystyrene. The patent to Dreisbach No. 2,270,184, January 13, 1942, is directed to the same problem, and it proceeds to eliminate the impurities by solvent extraction; but the adding of volatile solvents for the purpose of removing volatile content can hardly be expected to yield a completely solvent-free product, and that it does not yield a product entirely free from volatile is shown by the softening point of 84° C. (table on page 2 of the patent). Not only does pure polystyrene, as determined by the A. S. T. M. test, have a softening point of about 90°-92° C., but a product, free from material boiling in the styrene-ethylbenzene range and containing up to about 1.5 per cent of viscous polymers or by-products boiling up to 300° C. at 10 mm. pressure, has a softening point ranging from 85° to 90° C. It is to the minimizing of the percentages of these high boiling constituents, not recognized by the foregoing patents, and to the product so characterized, that the present invention is in part directed.

The polymerized styrene products of this invention are particularly distinguished from present commercial products by high softening points ranging from 85° to 90° C. as measured by the A. S. T. M. "Distortion Under Heat" test; this is of outstanding importance because it permits use at higher temperatures than the present commercial product will withstand and so widens the field of use. In addition, such products are characterized by improvements in other properties as well, such as flow-time, molecular weight, reduced percentage of methanol-soluble constituents, strength, power factors, etc. The flow-time is a measurement of melt-viscosity obtained by means of a Rossi-Peakes flow tester (U. S. Patent No. 2,066,016, December 29, 1936) determined by heat (135° C.) and pressure (1,000 pounds per square inch) applied to a tablet and noting the time required to reach the top of a ⅛ inch bore that is 1.5 inches long; the flow-time is a fairly accurate indication of the amount of residual volatile and low molecular weight constituents present, and apparently acting as lubricants, to lower the softening point and strength properties, and for injection molding the flow-time should be at least 100 seconds and for best physical properties should be between 300 to 500 seconds. The molecular weight measurement is made by the Staudinger method that is well understood and need not be described. The determination of the methanol-soluble constituents—which include not only volatiles in the styrene-ethylbenzene range but also the low polymers, such as styrene dimer and trimer and by-products boiling up to 300° C. at 10 mm.—is described in the Allen patent mentioned above. Polystyrenes, made in accordance with the present invention are characterized by a flow-time of 300 to 500 seconds, average molecular weights of 70,000-110,000, and a methanol-soluble content of not more than 1.5 per cent which content is substantially free from any material boiling in the styrene-ethylbenzene range. These properties are attended by improvements in other respects, such as mechanical strength and very low power factors in high-frequency electrical circuits. The Table I that follows offers a comparison in these properties with those of a good grade of commercial polystyrene designated as "Standard."

TABLE I

| Properties | Standard | | New | |
| --- | --- | --- | --- | --- |
|  | Range | Average | Range | Average |
| Softening point, °C. (Distortion under Heat) | 78-82 | 80 | 85-90 | 88 |
| Flow-time, sec | 100-200 | 150 | 200-500 | 400 |
| Av. mol. wt | 70,000-110,000 | 85,000 | 70,000-110,000 | 85,000 |
| Methanol-soluble, percent | 2.5-3.0 | 2.75 | 1.0-1.5 | 1.2 |
| Tensile Strength of bars, p. s. i.: |  |  |  |  |
| Compression-molded | 5,600-6,800 | 5,800 | 5,800-7,000 | 6,400 |
| Injection-molded | 6,500-8,000 | 7,250 | 7,500-8,900 | 8,750 |
| Flexural strength of bars, p. s. i.: |  |  |  |  |
| Compression-molded | 5,100-6,500 | 5,700 | 6,200-8,700 | 7,500 |
| Injection-molded | 14,000-17,000 | 16,500 | 15,000-19,000 | 18,500 |
| Power Factor: |  |  |  |  |
| 50 megacycles | 0.0003-0.0008 | 0.0004 | 0.00015-0.0003 | 0.0002 |
| 1200 megacycles | 0.0003-0.0008 | 0.0004 | 0.00015-0.0003 | 0.0002 |

A primary advantage of the process of this invention hereinafter set out, is that nothing need be added for its operation; this avoids the use of solvents, stabilizers, emulsifiers and other agents that are objectionable in the finished product and require removal. Moreover, the entire process from start to finish can be carried out in an inert atmosphere to prevent oxidation and degradation. Also, since the product need not be exposed during the process, there is little danger of contamination to cause discoloration and spoilage.

Toward the accomplishment of these and other ends, an important and distinguishing feature of the process is the initiation of the polymerization with agitation at relatively low controlled temperatures determined by the average molecular weight desired; after a partial conversion to the extent permitted by the viscosity for agitation at the low temperatures, the temperatures are progressively increased to high temperatures for securing and maintaining mobility toward the end or completion of the polymerization (i. e. to about 75-80 per cent or more of solids). By operating in this manner with agitation in the initial polymerization it is found that objectionable degradation and formation of low polymers (normally occurring in a high temperature operation) are considerably minimized.

As previously stated, agitation in the initial polymerization is essential, if objectionable amounts of low molecular weight polymers (below 30,000 in the case of polystyrene) are to be avoided because of the poor heat conductivity and the exothermic nature of the polymerizing action; moreover, the longer adequate agitation can be continued with relation to the degree or percentage of polymerization, the more closely does the mass approach the average molecular weight determined by the temperature of reaction. Accordingly, agitator equipment has been devised which secures a substantial turbulence throughout the entire mass, without material portions being left in a quiescent condition to increase in temperature with consequent lowering in molecular weight. For this purpose a series of agitators are vertically arranged on a common shaft in the autoclave; the blades are so shaped that the top agitator forces the mass generally downward and outward, the bottom agitator forces the material inward toward the axis, and the one or more intermediate agitators cause both an inner upward and an outer downward movement. The agitator equipment is made particularly rugged in order to operate on heavy viscous masses.

Batch Operation

It has been found possible to carry out a substantially complete polymerization by the progressive increase to high temperatures in the autoclave itself. For commercial size batches (200 gallons) such an approach to a completion of the reaction is secured in an autoclave especially equipped for heavy agitation. For example, the polymerization of styrene is initiated with agitation at a temperature controlled at around 100°–120° C. to about 60 per cent conversion or until the viscosity becomes too high for further agitation. The viscosity is then reduced by permitting the temperature (controlled by vacuum application) to gradually rise to compensate for the continually increasing viscosity or formation of solids; in this way a temperature of 120°–140° C. and a conversion to about 75–85 per cent solids can be attained with continued agitation. At this point the temperature is allowed to rise to about 200°–225° C. with a consequent increase in mobility so that unreacted styrene and impurities of similar boiling point can be drawn out by applying a high vacuum, and the mass is soft enough to be ejected by blowing with a gas under pressure. The operation is preferably carried out in an atmosphere of inert gas, such as nitrogen, and nitrogen is used for blowing out the reacted material to avoid the marked degradation that follows from contact of the hot styrene polymer with oxygen. Polystyrenes of about 97–98 per cent solids with average molecular weights ranging between 70,000 to 90,000 and flow-times of about 130 to 180 seconds have been obtained by this type of batch operation in the autoclave.

By the operations in the autoclave alone, however, the removal of impurities and volatiles is difficult due to the limited agitation in the final stage. It has been found that further improvement can be obtained with a surprising increase in flow-time (showing an increased removal of liquid or lower polymer which serve as softening agents) by submitting a styrene batch, for example, polymerized to the extent of 55 to 60 per cent at low temperature in an autoclave, to a mechanical working in an enclosed kneader and out of contact with air, and preferably with applied vacuum. In this operation, agitation by the Sigma-shaped kneader blades is continued as long as possible at a temperature below 140° C. in an atmosphere of nitrogen under pressure to prevent boiling of the styrene, and then the temperature is rapidly raised to above 200° C. and held for a period during which the pressure is dropped to atmospheric and nitrogen passed through to boil out and carry off the volatiles while the heat-softened mass is agitated. By this means styrene, polymerized to about 55 per cent solids in the autoclave, was further polymerized in the kneader to about 98–99 per cent solids with an average molecular weight of from 80,000–100,000 and a flow-time of 200–250 seconds; similar batches taken from the autoclave had by the Allen patent process (after 5 minutes rolling on hot milling rolls) an average molecular weight of 75,000–95,000, an average flow-time of 105–150 seconds, and about 97–98 per cent solids.

Continuous Operation

The process improvements disclosed above are directed to batch operations with the objections inherent in them, such as unavoidable variations in successive batches due to changes in temperature, time periods, extent of working, etc.; a batch process also imposes limitations upon the scale at which the operations can be performed with consequent small output and relatively high costs. Accordingly, large scale operations demand a continuous process; but this in turn requires the mass to be in constant progressive motion from the beginning to the finish and with fresh monomer added in amount and rate corresponding to the amount and rate of discharge of the finished product.

It has now been found that a continuously operating process with accurate control of the product is made possible by the addition to an autoclave of a depending polymerizing tube in which the polymerization (in the case of styrene carried to about 75—80 per cent solids and about 125° C. in the still) can be further advanced by a progressive reaction to a final one of 97–98 per cent under temperatures progressively increasing through the tube from about 125° C. to about 220° C. This operation is materially aided by a blade construction of an agitator in the autoclave which forces the polymerized mass through the autoclave opening into the tube in addition to its function of contributing to the circulation within the mass; it has been found that pressures as high as 25 pounds per square inch on the stream discharging from the autoclave can be thus obtained, and these pressures suffice to cause longitudinal movement through the polymerizing tube without additional pressure means. Preferably, however, a screw conveyor operating in the discharge duct of the autoclave is added to insure a uniform and controlled movement, and it contributes to the pressure acting on the mass progressing through the tube.

The regulation and control of temperature is a problem because increase in temperature decreases the viscosity but increases the polymerization rate with increase in solids and corresponding increase in viscosity; moreover as the reaction is strongly exothermic, any increase in temperature tends to become progressive. It has been found, however, that by the installation of a preheater at the entrance to the polymerizer tube whereby the material from the still can be rapidly heated, temperatures both in the still and the tube can be varied over a fairly wide range to permit the selection of those conditions leading to an improved product.

The finishing of the polymerization continuously within the polymerizing tube does not accomplish the separation of volatiles remaining in the product to vitiate its properties; the mechanical working of the mass is necessary to this end. Working on differential rolls is essentially a batch process with the added objection of working in air to degrade the product; and working by means of a kneader is likewise normally a batch proceeding which has the added disadvantage of limited agitation and exposure of surface for volatile release from a highly viscous mass such as polystyrene. To make the continuous process yield a satisfactory product, therefore, necessitates a milling or working that is likewise continuous.

Accordingly, the present invention from the continuous process aspect also includes as a step the provision of a mechanical working operation on the polymerized product which combines the functions of milling the product to secure release of volatile and blending of the product into a homogeneous character with the conveying of the product so that it can be operated upon continuously and discharged as a continuous rod, ribbon, strip or any other desired configuration. This is accomplished by means of cooperating milling rolls, each roll having on its cylindrical surface a projecting helical thread and a groove for receiving the thread of the opposite roll with a clearance between the rolls; with such a construction the roll surface components parallel to the axes perform the milling and the components perpendicular to the axes provide the propulsive action. In the preferred form the rolls are enclosed in a housing so that an inert atmosphere and/or a vacuum can be supplied, and degradation due to oxidation can thus be prevented.

As practiced in the polymerization of styrene, the continuous process is initiated in the still (holding about 800 pounds) by heating to about 100° C. and then permitting the heat of reaction to continue the polymerization; in fact some heat must be dissipated, and this is accomplished by maintaining a vacuum of 18 to 22 inches of mercury depending on the temperature level and the consequent average molecular weight desired. It requires about 32 hours in the still at an exit temperature of 125° C. to reach a polymerization of about 70-80 per cent solids. In the preheater the temperature is increased to about 175° C., and it takes about 8 hours on the average to progress through the jacketed polymerization tube with a gradual increase in temperature to about 215° C. and a polymerization of about 95-97 per cent solids. In the milling the temperature rises to about 225° C. while maintained under a vacuum of 29 inches mercury; about 2 pounds are conveyed through the mill over a period of about 5 minutes, and a polystyrene of 98.5-99 per cent and better emerges when an atmosphere of nitrogen is swept through the chamber.

The continuous process, therefore, is one involving the steps (a) initiation and partial polymerization in an agitated zone under controlled comparatively low temperature, (b) finishing the polymerization in a high temperature zone, and (c) mechanically working or milling the hot plastic polymerized product for the removal of volatile and blending the resultant product into a homogeneous mixture of polymers. In addition it has been found that a fourth step (d) of stretching the polymer as it is discharged imparts some unexpected results. These steps are considered individually in further detail.

Step (a)—Initial partial polymerization

For continuous operation it is necessary to keep the entire still mass in constant motion such as to combine the two functions (1) of rotating and kneading the mass to promote uniformity of reaction throughout and homogeneity in the product and (2) of transferring the product as it polymerizes toward and through the exit. This motion is secured by an agitator combination, wherein the top blades rotate and press downwardly to cause an outward and downward flow, the bottom blades sweep the mass inwardly toward the outlet, while the intermediate blades with their double curvature cause an upward flow at the axis and a downward flow at the periphery to create vortices carrying portions toward and away from the shaft; in the meantime the entire mass swirls with the agitator blades as they are rotated. The total effect is a gradual downward movement with all portions in motion with in-and-out crosswise movements.

Temperature regulation in this step of the process is obtained by the maintenance of a vacuum on the top of the mass. The degree of vacuum controls the boiling point of the styrene monomer from the viscous reaction mass and consequently the temperature of the mass. The usual condensing and reflux system returns the distillate to the reaction mix where it is again mixed into the reaction mass.

A further improvement in this part of the process is the subdivision into several steps by providing a series of stills. For example three stills can be used. In the first the monomer is charged at 25° C. and polymerized to about 35 per cent solids at a reaction temperature of about 100° C. The polymerization is continued in the second to about 65 per cent solids over a temperature range of 115°–120° C. In the third still further polymerization to about 85 per cent solids is secured at a temperature of about 140° C.

Step (b)—Completed polymerization

By the continuous segregation of a portion of the partially polymerized mass from the autoclave mass under reaction into a progressive-polymerizer tube, the application of high temperatures is made possible. At the entry to the polymerizer tube the viscous stream discharged from the still at a temperature about 125° C. is quickly raised to about 175° C. by heating in a heat exchanger or it may be allowed to proceed more slowly by its own exothermic action only. In its progress from the heat exchanger through the tube the stream becomes hotter, largely through the heat released by the accelerated continued polymerization, and it emerges at a temperature of about 210–215° C. with a polymer content of 95 to 97 per cent depending upon the rate of production. By proper proportioning and disposition of the tube parts, it has been found possible to control the movement through the tube and bring the rate at which the polymerization continues into balance with the rest of the system.

Step (c)—Continuous milling

The threaded rolls within an enclosed housing serve not only to mill but to blend the polymer product which may not be uniform, on account of passing through the high temperature progressive-polymerizing tube in a viscous flow without any agitation. The housing enclosure permits the use of an inert atmosphere or vacuum or both, and oxidation and contamination are thus avoided; this is of importance, since the milling operation is carried on in the high temperature region of about 225° C. Because of the milling, styrene of lower monomer content or higher volatile diluent content can be satisfactorily polymerized; and it has been found that high boiling constituents, such as dimers and trimers, are removed from the final product in the milling.

A further effect of the milling is to break down the very high molecular weight (above 150,000) polymers and increase the proportion in the intermediate range without material increase in the low polymers (below 30,000). This effect materially improves the product for injection molding as it is a mixture of polymers ranging between 30,000 and 150,000 that is most satisfactory for the purpose.

The importance of the milling operation is made strikingly apparent by data obtained in the continuous milling of a polymerized styrene of 96 per cent solids, an average molecular weight of 92,500 and a flow-time of 66 seconds. This was subjected to milling, at a rate requiring five minutes for transfer through the mill; in some tests vacuum and an inert atmosphere of nitrogen were used, and in others atmospheric pressure and air. The results are given in the following Table II.

TABLE II

| Sample No. | Conditions of Milling | | | Product Leaving Rolls | | |
|---|---|---|---|---|---|---|
| | Vac. | Gas Envelope | | Insoluble | Mol. Wt. | Flow in Sec. |
| | | Kind | Volume | | | |
| | | | Cc./sec. | Per cent | | |
| a | 29.7 | N₂ | 80 | 99.1 | 90,800 | 432 |
| b | 29.7 | N₂ | 80 | 99.4 | 92,000 | 485 |
| c | 29.8 | N₂ | 80 | 99.0 | 97,000 | 516 |
| d | 0 | N₂ | 80 | 98.4 | 101,900 | 313 |
| e | 0 | Air | 80 | 98.2 | 49,700 | 146 |
| f | 0 | Air | 20 | 98.0 | 53,900 | 123 |
| g | 29.0 | Air | 20 | 99.2 | 93,500 | 465 |
| h | 29.0 | Air | 80 | 99.1 | 91,300 | 447 |
| i | 29.0 | N₂ | 80 | 98.8 | 97,200 | 501 |

In the table submitted, samples e and f were rolled continuously in a moving air stream at atmospheric pressure in contrast to all the other samples which were milled in a moving air or nitrogen stream at the lowest gas pressure (highest vacuum) obtainable in the system. The machine, by attenuating the gas envelope, even renders air innocuous as shown by comparing samples g and h with e and f; and the profound drop in both molecular weight and flow-time when air at normal pressures is present to react with the hot polymer clearly brings out the advantages inherent in the apparatus.

*Step (d)—Stretching*

For molding purposes, additional improvements are found to follow from a stretching of the hot polymer as it cools; thereby strains are locked in the material, and the added energy when released in molding makes for greater ease in the operation and for better uniformity in the finished article. The imparting of the energy to the product is accomplished by extruding the milled product through a die orifice in the form of a rod and picking up the hot rod on pulleys operated at a speed to give the rod a stretch in excess of 50 per cent and usually of about 300 per cent during the cooling; the cooled rod is then passed to a cutter where it is cut into pellets or segments of a length desired for commercial molding and extrusion operations. It has been observed that the pellets contract when reheated; and evidently this contraction taking place during molding or extrusion introduces a considerable degree of movement which facilitates the mixing of the heated pellets and the flow in the molding operation.

IN GENERAL

Vinyl type polymers in general are like polystyrene in having a very high viscosity in the molten state, and it follows that the processing is useful for handling other vinyl compounds besides styrene. There are also copolymers of styrene and similar vinyl compounds with other plastics, such as butadiene, etc. that can be prepared, for the processing finds peculiar application for copolymerization, particularly in a batch operation when the reaction rates of the components differ and one should be continuously added throughout the reaction period; the high temperature features make this feasible, since the material can be kept in agitation or motion substantially for the entire process period.

A number of factors, hereinbefore indicated, contribute to the surprising improvements attained in the polymerized products. The maintenance of low temperatures in the initiation of the polymerization and the continuance of the polymerization to a high degree of conversion at the desired temperatures, made possible by the heavy agitator equipment in the autoclave, are deciding factors in securing the substantial absence of low molecular weight constituents. The progressive completion of the polymerization at gradually increasing temperatures to maintain the mobility necessary for movement (which may be assisted by some positive means as a screw conveyor) is secured by the polymerizing tube. The milling in an inert atmosphere, and particularly under a high vacuum, is chiefly responsible for the reduction in methanol-soluble constituents from 2.5 per cent to 1.5 per cent and less, and this with a raising of at least 5 degrees C. in the softening point. The softening point rise is of great importance in the commercial uses of the products, and the decrease in volatile content greatly improves resistance to weathering and provides against surface deterioration.

APPARATUS

An apparatus for the continuous polymerization of a plastic and embodying structure for accomplishing the aforementioned improvements is illustrated in the accompanying drawing in which Fig. 1 is an elevation, largely in cross-section of an assembly;

Fig. 2 is a cross-section on the line 2—2 of Fig. 1; and

Fig. 3 is a cross-section on the line 3—3 of Fig. 1.

The assembled apparatus is comprised of three primary parts:

A—an autoclave with associated elements for partial polymerization;

B—a polymerizing tube for continuing the polymerization; and

C—a milling structure for mechanically working the polymerized styrene and releasing volatile.

PART A

The autoclave part consists of a closed still body or reaction vessel 10 having about its lower portion a jacket 11 for heating or cooling fluid to regulate the temperature; the still has a capacity of about 800 pounds. Passing through a bushing 12 at the top of the still is a vertical agitator shaft 13 which carries a series of agitator blades 14, 15 and 16 and ends in a conveyor screw 17 extending into the outlet 18 of the still and into a jacketed coupling 19. Because of the high viscosity of the polymer formed, the agitator structure is rugged and heavy; of the series the top blades 14 serve to force the mass in movements outwardly and downwardly, the intermediate blades 15 accentuate this action at the outer ends while causing an upward flow near the shaft, and the bottom blades 16 (shown in Fig. 2) scrape the mass from the sides and force it inwardly toward the shaft and out of the outlet. Additional intermediate blade agitators can be included. The upper end of the shaft is connected by a gear reducer 20 to a motor or other driving mechanism not shown.

At the upper end of the still is an outlet pipe 21 for distillate controlled by a valve 22 and leading to a condenser 23. The condenser has a vapor-discharge line 24 with control valve 25 leading to a vacuum pump (not shown) and a condensate-discharge line 26 having therein a sight glass 27 for observation. Two branches 28, 29 with valves 30, 31 connect to the line 26; and one branch 29, provided with a trap 32 and discharge valve 33, leads back to the still.

Liquid monomer is drawn into the still through a feed line 34 controlled by a valve 35 from a feed drum 36. In the line is a rotameter 37 to indicate the rate at which the monomer flows into the still.

In the side of the still 10 is a tube 38 for receiving a thermometer. The still also has a sight glass 39 for watching the operation.

PART B

The polymerizing tube is suspended from the coupling 19, and it consists of five sections. The first section is a tubular preheater 40 with a heating jacket 41 and carrying an axially-disposed mandrel 42 by means of fins 43 to form an annular passage through which the plastic flows. The second section is a first reaction tube 44 with a heating jacket 45. The third section is a coupling 46 supporting a torpedo 47 by fins 48 to leave an annular passage; an inlet pipe 49 and an outlet pipe 50 to the torpedo provide for a heating fluid into and out of the torpedo. The fourth section is a second reaction tube 51 with jacket 52. The fifth and last section is a discharge funnel 53 with a jacket 54.

PART C

Attached to the funnel 53 forming the outlet of the polymerizer B is an enclosed continuous vacuum roll-mill for mechanically working the polymerized product. It consists of three sections: a hopper 61, a housing 62 and a closure casting 63. The hopper has a slide gate 64 for controlling the feed of polymerized plastic. A pair of intermeshing helically-threaded rolls 65, 66 (Fig. 2) extend from the hopper 61 and through an opening 67 into the housing 62; these rolls lie in the saddle-shaped bore 68, have a clearance between them to provide a bite and have a close clearance with the sides of the bore which extend within a part of the housing over at least one-half the circumference of the rolls; the rolls are completely encircled at the entrance to and the exit from the housing. The rolls are supported at the receiving end by stub shafts journaled in bearings in the wall 69 of the hopper, and at the other end by shaft extensions 70 passing through bearings in the casting 63. The screws for their major length have V or other suitable form of milling threads; but at the discharge end they are given square threads and completely enclosed to provide a positive pumping action. Above the V thread portions there is chamber 71 with an outlet 72 for connection to a condenser, vacuum pump and receiver; and a tube 73 opens into the chamber for feeding inert gas. The chamber has a surrounding heating jacket 74. There is an outlet port 75 through the casting 63; and sight glasses 76 are provided in the housing 62.

In operating the assembled apparatus, liquid monomer is continuously fed into the still from the drum 36 through the pipe 34. In its progress through the still it becomes polymerized by the heat of polymerization which is more than enough to continue the action; the excess heat is removed and the desired temperature maintained by the degree of vacuum (18–22 inches mercury) applied which regulates the boiling point of the monomer. The agitator blades churn and distribute the mass; and as the product is withdrawn through the outlet 18, there is a gradual constant movement downwardly through the still.

The bottom agitator blades 16 and the screw conveyor 17 regulate the discharge from the still and force it into the preheater of the polymerizing tube B. Here it is quickly raised in temperature to progress through the first reaction section 44. Further heating by the torpedo 47 increases its mobility for further flow through the second reaction tube 51 and final discharge through the funnel 53 and gate 64 into the milling machine.

The operation of the threaded rolls combines the functions of milling and conveying. The threads become coated with polystyrene and continually expose fresh polystyrene surfaces collected from the small pools of churning excess material carried in the thread grooves within the bore through the opening 67. The rolls are preferably rotated in counter-directions to draw some of the material preferably upward through the clearance between the intermeshing threads while the remainder is conveyed toward the discharge end. The square threads at the discharge end act as a positive pump to eject the polystyrene through the port 75. In the operation both the entrance and exit openings are sealed by the material, so that a high vacuum (29–29.9 inches of mercury) can be maintained in the housing. While the milling action is going on, the interior is swept by a stream of nitrogen to carry off released volatiles to the receiver, and the removal of volatiles can be accentuated by the vacuum application.

The hot polymer is discharged through orifices in a plate at the exit end of the roll-mill housing and picked up on a series of pulleys operated at such a speed as to reduce the cross-section area and give the material a stretch in excess of fifty per cent and usually of about 300 per cent during cooling. The cooled rod then passes to a cutter where it is cut continuously into segments of the length desired for commercial molding and extrusion operations.

What is claimed is:

1. A continuous process for polymerizing styrene monomer in a closed system which comprises initiating polymerization by heating the styrene monomer to about 100° C. in a first enclosed heating zone, continuously agitating and controlling the temperature of the polymerizing monomer in said zone between about 100° and 125° C. to form a mixture of styrene polymers and unpolymerized monomer, continuously removing a portion of the mixture from said first heating zone and transferring said portion to a second enclosed heating zone while replenishing the first heating zone with more styrene monomer, continuously moving said portion through the second heating zone and polymerizing more of the monomer in the mixture by heating to higher temperatures of up to about 175° C., continuously removing from the second heating zone a polymerized mass of upwards of about 85 percent solids, increasing the temperature of the mass removed from the second zone to about 200° to 225° C., and then removing volatile matter from the mass by milling it in contact with a moving stream of gas at less than atmospheric pressure to carry off the released volatile matter until the mass has a methanol-soluble content not more than 1.5 percent and a flow time of 300 to 500 seconds to travel a distance of 1.5 inches under 1000 p. s. i. and at 135° C. in a flow tester of ⅛ inch bore.

2. A continuous process for polymerizing styrene monomer in a closed system, which comprises intitiating polymerization by heating the styrene monomer to about 100° C. in a still, continuously agitating and maintaining the temperature of the polymerizing mass of monomer between about 100° and 125° C. to form a mixture of styrene polymers and monomer of up to about 70 to 80 percent solids, continuously removing a portion of said mixture while replenishing the still with more styrene monomer in amount corresponding to the mixture being withdrawn, continuously moving the portion withdrawn through a tubular polymerizing chamber while progressively increasing the mixture's temperature up to about 220° C. until the mixture is substantially polymerized to about 95-97 percent solids, continuously discharging the substantially polymerized mixture from said chamber, removing volatile material therefrom by milling the substantially polymerized mixture at about 225° C. and in contact with a moving stream of gas at less than atmospheric pressure to carry off released volatile material until the mixture has a methanol-soluble content not more than 1.5 percent and a flow time of 300-500 seconds to travel a distance of 1.5 inches under 1000 p. s. i. and at 135° C. in a flow tester of ⅛ inch bore.

3. A continuous process for polymerizing styrene monomer in a closed system which comprises initiating polymerization by heating the styrene monomer to about 100° C. in a still, continuously agitating the polymerizing mass of monomer while controlling the temperature of the mass between about 100° and 125° C. by vacuum refluxing to form a viscous mixture of styrene monomer and polymers, continuously removing a portion of said mixture from the still while replenishing the still with more styrene monomer, gradually heating the removed portion up to a temperature of about 215° C. while being progressively moved through a tubular extension of the closed system at a rate yielding as a discharge from said extension a polymerized mixture of about 95 percent solids, removing volatile matter from the 95 percent solids mixture by milling it about 225° C. and under a vacuum of about 29 inches mercury until the mixture has a methanol-soluble content not more than 1.5 percent.

4. A continuous process for polymerizing styrene monomer in a closed system which comprises initiating polymerization by heating the styrene monomer in a still to a reaction temperature of about 100° C. and with continuous agitation to form a partially polymerized mixture of about 35 per cent solids, continuously removing a portion of said mixture from the still while replenishing the still with more styrene monomer, continuing the polymerization of the removed portion to about 65 percent solids by heating in a second still at temperatures between 115°-120° C., continuously removing from the second still the 65 precent polymer mixture and further polymerizing it by heating to about 140° C. in a third still, continuously discharging a polymerized mixture of about 85 percent solids and higher from the third still, heating this last discharge to about 220° C. and removing volatile matter therefrom by milling it in an attenuated atmosphere and in contact with a moving stream of gas to carry off released volatile matter until the methanol-soluble content of the polymerized mixture is reduced to at least 1.5 percent.

5. Method for increasing the heat-distortion temperature and reducing methanol-soluble constituents of a polystyrene with minimum change of its average molecular weight, which comprises heating to about 225° C. and in a closed system a polystyrene having an average molecular weight between 70,000 and 100,000 and more than 1.5 percent of methanol-soluble constituents, milling the heated polystyrene in a partial vacuum while removing volatile matter released from the polystyrene during milling by a moving stream of inert gas until the polystyrene contains not more than 1.5 percent methanol-soluble constituents and its melt-viscosity as determined by flowtime in a Rossi-Peakes flow tester of ⅛ inch bore to travel a distance of 1.5 inches under 1000 p. s. i. and at 135° C. has increased to at least 300 seconds.

6. A continuous process for polymerizing styrene monomer in a closed system which comprises initiating polymerization by heating the styrene monomer to about 100° C. in a still, continuously agitating the polymerizing mass of monomer while controlling the temperature of the mass between about 100° and 125° C. by vacuum refluxing to form a viscous mixture of styrene monomer and polymers, continuously removing a portion of said mixture from the still while replenishing the still with more styrene monomer, gradually heating the removed portion up to a temperature of about 215° C. while being progressively moved through a tubular extension of the closed system at a rate yielding as a discharge from said extension a substantially polymerized mixture containing more than 2 per cent methanol soluble matter, removing volatile matter from the polymerized mixture by mechanically working it at about 225° C. in a vacuum until the polymerized mixture has a methanol-soluble content less than 2.0 per cent.

7. Method for increasing the heat-distortion temperature and reducing methanol-soluble constituents of a polystyrene with minimum change of its average molecular weight, which comprises heating to about 225° C. and in a closed system a polystyrene having an average molecular weight between 70,000 and 110,000 and more than 2.0 per cent of methanol-soluble constituents, and mechanically working the heated polystyrene in a partial vacuum while removing volatile matter released from the polystyrene during working by a moving stream of inert gas until the polystyrene contains less than 2.0 per cent methanol-soluble constituents.

IVEY ALLEN, Jr.
WALTER R. MARSHALL.
GORDON E. WIGHTMAN.

REFERENCES CITED

The following references are of record in the file of this patent:

UNITED STATES PATENTS

| Number | Name | Date |
|---|---|---|
| 2,082,796 | Gaertner | June 8, 1937 |
| 2,174,319 | Gastrow | Sept. 26, 1939 |
| 2,240,618 | Harris | May 6, 1941 |
| 2,270,184 | Driesbach | Jan. 13, 1942 |
| 2,273,822 | Allen | Feb. 24, 1942 |
| 2,318,742 | Britton | May 11, 1943 |
| 2,331,273 | Lowry | Oct. 5, 1943 |
| 2,359,196 | Britton and LeFevre | Sept. 26, 1944 |
| 2,367,805 | Semple | Jan. 23, 1945 |
| 2,394,407 | Soday | Feb. 5, 1946 |

FOREIGN PATENTS

| Number | Country | Date |
|---|---|---|
| 443,405 | Great Britain | Feb. 27, 1936 |

OTHER REFERENCES

Barron: "Modern Plastics," pages 629–30, Wiley, London (1945).

Brajnikoff: Plastics (London), July 1942, pp. 230–238.

Simonds and Ellis: Handbook of Plastics (July 1943) pp. 190–192.